(12) United States Patent
Saracco

(10) Patent No.: US 7,343,798 B1
(45) Date of Patent: Mar. 18, 2008

(54) METHOD, APPARATUS, HARDWARE, AND COMPUTER PROGRAM PRODUCT FOR A LIQUID LEVEL SENSOR

(76) Inventor: Ronald Alfred Saracco, 1030 Jennings Rd., Fairfield, CT (US) 06430

( * ) Notice: Subject to any disclaimer, the term of this patent is extended or adjusted under 35 U.S.C. 154(b) by 0 days.

(21) Appl. No.: 11/728,830

(22) Filed: Mar. 27, 2007

(51) Int. Cl.
  *G01F 23/26* (2006.01)
(52) U.S. Cl. .................................. 73/304 R; 73/304 C
(58) Field of Classification Search .............. 73/304 R, 73/304 C
  See application file for complete search history.

(56) References Cited

U.S. PATENT DOCUMENTS 6,125,696 A   10/2000  Hannan et al.
2007/0252715 A1*  11/2007  Reddy et al. ............... 340/620

\* cited by examiner

*Primary Examiner*—Hezron Williams
*Assistant Examiner*—Paul M West
(74) *Attorney, Agent, or Firm*—Alfred A. Fressola; Ware, Fressola, Van Der Sluys & Adolphson LLP

(57) ABSTRACT

A method, apparatus, hardware, and computer program product for measuring a parameter related to the height of a liquid in a measurement vessel. An alternating voltage is applied to an input rod positioned in a reference vessel containing the liquid at a known height. A reference signal is obtained from a collector rod positioned in the reference vessel. An alternating voltage is also applied to an input rod positioned in the measurement vessel, and a measurement signal is obtained from a collector rod positioned in the measurement vessel. A parameter related to height of liquid in the measurement vessel is obtained based upon a relationship between the reference voltage and the measurement voltage, wherein the parameter is substantially independent of the electrical conductivity of the liquid in the vessels. Circuitry for determining the height is described.

19 Claims, 8 Drawing Sheets

METHOD, APPARATUS, HARDWARE, AND COMPUTER PROGRAM PRODUCT FOR A LIQUID LEVEL SENSOR

FIELD OF INVENTION

The present invention relates generally to measurement of liquids, and more particularly to electronic measurement of the height, volume or other physical characteristic of a liquid in a vessel.

BACKGROUND OF INVENTION

It is known to use a capacitative probe to measure liquid level. See, for example, "Digital Liquid Level Sensing Apparatus", Hannan et al. (U.S. Pat. No. 6,125,696). However, such methods are dependent upon the dielectric constant of the liquid involved. Furthermore such measuring devices can electrically short out due to conductive internal structures. Also, capacitative probes often do not provide the accuracy that is required in various applications.

One of the problems associated with measuring the height of a liquid in a vessel using an electrical property of the liquid is that different liquids can have widely different conductivities (ability of a material to conduct an electric current) and the conductivity of the same liquid can vary depending upon its temperature. It would be desirable to use the electrical property of the liquid to accurately measure the height (which in turn can be used to determine other properties of the liquid, e.g., volume and weight) of the liquid in the vessel regardless of the conductivity or temperature of the liquid in the vessel.

SUMMARY OF INVENTION

The present invention describes an accurate method, apparatus, and hardware and computer program product for measuring the height of a liquid in a vessel, using an electrical property of the liquid. The method described does not have to be readjusted to measure liquids that differ in conductivity or temperature.

Two vessels (also referred to herein as containers) are used: a reference vessel and a measurement vessel.

The reference vessel is filled to a known level (height), and the height (level) of the measurement vessel is to be determined. Two conducting rods are placed in the reference vessel, and two conducting rods are placed in the measurement vessel. In each vessel, one rod (the input rod) has a voltage applied thereto, and the other rod (the collector rod) has a voltage impressed thereon (the sense voltage) based on the current flow through the liquid. By applying an alternating voltage to the input rod in each of the vessels, electrical current flows to the collector rod in each of the vessels. The more deeply immersed the rods are in the liquid, the greater the amount of electrical current that will flow to the collector rod. This makes it possible to determine the height of liquid in the measurement vessel, based upon a relationship between a voltage sensed at the collector rod in the reference vessel, and the voltage sensed at the collector rod in the measurement vessel.

The values associated with the electrical properties of the liquid in the reference vessel for the liquid at a known height can be stored in a memory, thereby eliminating the need for a reference vessel to be present when measurements are made in the measurement vessel. The reference vessel values can include values for the liquid at different temperatures and can include values for different types of liquids (liquids with different conductivities). It is also possible to use a single vessel as a reference vessel, and then subsequently as a measurement vessel.

DETAILED DESCRIPTION OF THE INVENTION

Figure 1:
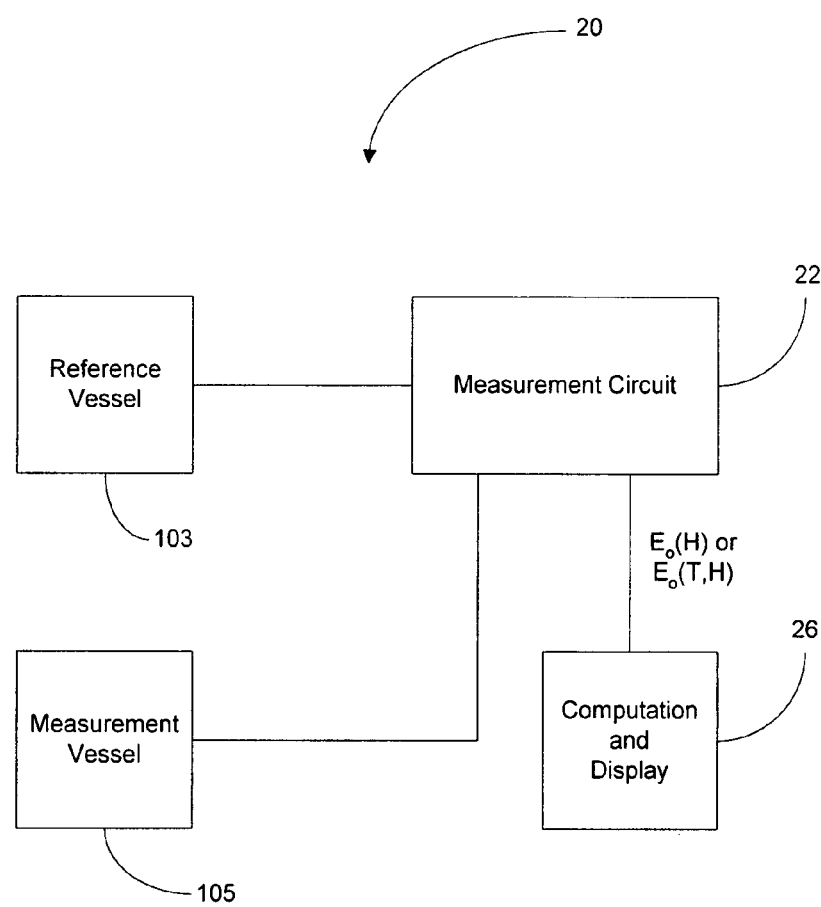
FIG. 1 shows an embodiment of a measurement device according to the present invention.

FIG. 1 shows an embodiment of a measurement device 20 according to the present invention. It shows a reference vessel 103, a measurement vessel 105, a measurement circuit 22, which may include a thermal compensating circuit 24, and a computation and display module 26. As explained below, the reference vessel 103 need not actually form part of the measurement device when in use, if the values associated with it (as explained below) are stored in a memory 40 (see FIG. 7) of the computation and display module 26.

Figure 1A:
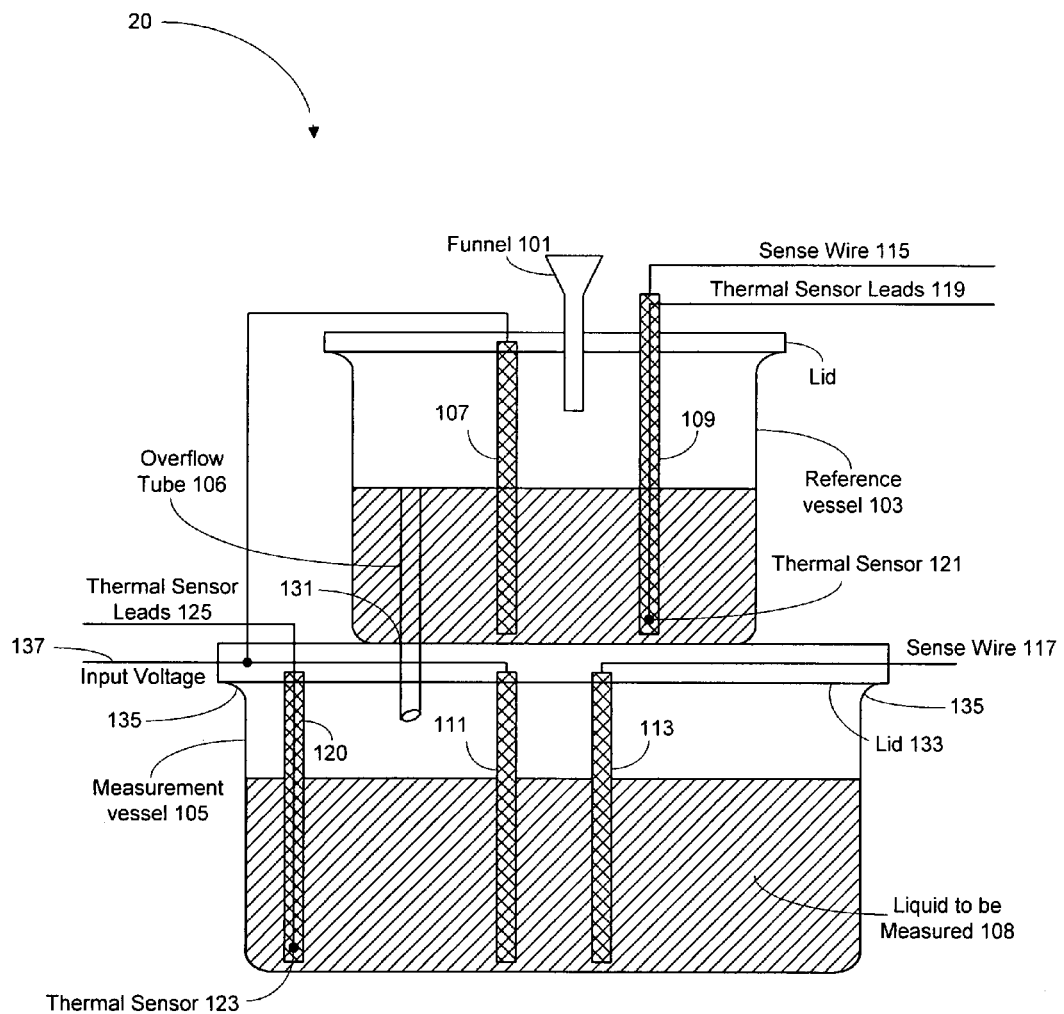
FIG. 1A shows the arrangement of a reference vessel and a measurement vessel which can be used as part of the measurement device.

FIG. 1A illustrates one way of positioning reference vessel 103 and measurement vessel 105. A lid 133 can be positioned over a peripheral flange 135 of the measurement vessel 105 so as to support reference vessel 103. The purpose of the measurement device is to find the height of liquid 108 in a measurement vessel 105, as shown in FIG. 1A. Note that, if the measurement vessel were to have a non-horizontal bottom, then the present invention would still be feasible, by using liquid height at a particular location. Other physical parameters of the liquid can be determined once the height of the liquid is known; such as volume and weight, provided that the geometry of the measurement vessel is known as well as the specific weight of the liquid (to determine weight). By passing alternating current through both the measurement vessel and a reference vessel 103, and dividing the current of the reference vessel into the current of the measurement vessel, a parameter (ρ) is determined that is independent of the conductivity of the liquid in the vessels. The parameter is therefore directly related to the height of the liquid in the measurement vessel as compared to the height of the liquid in the reference vessel. From knowledge of the height of the liquid in the reference vessel, the height of the liquid in the measurement vessel is directly obtained by the equation:

$$H_M = H_R \times \rho \quad (1)$$

where ρ is the sensed parameter.

The height of the liquid in the measurement vessel can be used to determine the volume and/or weight of the liquid in the measurement vessel based upon known geometry of the measurement vessel and (for weight) based on the specific weight of the liquid. In this embodiment, the measurement vessel is substantially a right circular cylinder having volume given by the equation:

$$V_M = \pi L_M^2 H_M, \quad (2)$$

where, "$L_M$" is the inner radius of the measurement vessel, "$H_M$" is the height of the liquid, and π is approximately 3.14159. The alternating current (AC) that flows through the liquid is proportional to the height "$H_M$", because an immersed conducting rod has a surface area in contact with the liquid in proportion to the height of the liquid.

The volume of the liquid in the measurement vessel is based on the geometry of the vessel and the height of the liquid in the vessel. For a right circular cylindrical vessel as shown in FIG. 1A, equations (1) and (2) yield:

$$V_M = \pi L_M^2 H_M = \pi L_M^2 H_R \times \rho \quad (3)$$

In practice, the reference vessel is typically filled up to the top of the overflow tube, and the remainder can be emptied into the measurement vessel. In this way, the height of the liquid in the reference vessel is known. For the test apparatus in FIG. 1A, liquid is poured into funnel 101, reference vessel 103 is filled to the overflow tube 106, with any excess liquid flowing into the measurement vessel 105. The measurement vessel 105 may be made from plastic, and the reference vessel 103 may also be made from plastic, which facilitates forming a hole 131 therein for passage of the overflow tube 106. Of course, liquid can be poured into the measurement vessel by any other suitable device, and need not enter solely or partially through the overflow tube. In fact, the reference vessel and the measurement vessel can be separated from each other.

Figure 2:
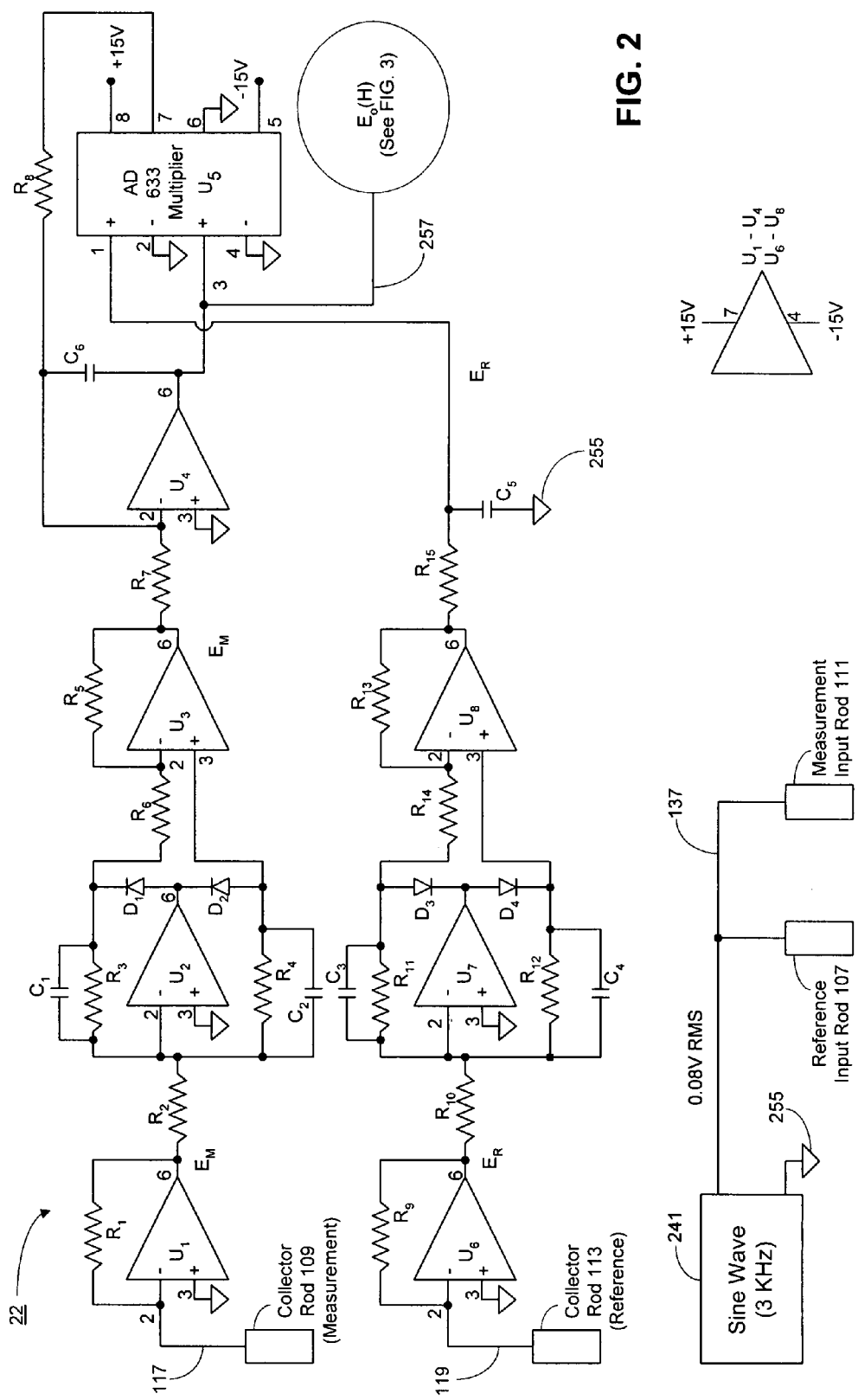
FIG. 2 is a schematic diagram of the measurement circuit according to an exemplary embodiment of the invention without temperature compensation.

Voltage is applied to input rods 107 and 111 via input wire 137, and as a result, current flows to collector rods 109 and 113 respectively with each current dependent on the height of the liquid contacting the input and collector rods for each vessel. The sense voltage from the reference vessel collector rod 109 and the measurement vessel collector rod 113 is obtained by sense wires 115 and 117 respectively. As seen in FIG. 2, a return path to electrical ground 255 from sine wave generator 241 that generates the AC input completes the current path.

Measurement Circuitry

An electrical schematic of measurement circuit 22 is shown in FIG. 2. Various resistances and capacitances are shown in the figures for this embodiment of the invention, and their values are as indicated in Table I and Table II (resistances are in kilohms (0.1% tolerance except R1 and R9 at 1% tolerance) and capacitances are in microfarads). Actual values used for the components listed can have typical electrical tolerances known in the art. All operational amplifiers in this embodiment of the invention are OP27 type amplifiers.

TABLE I

| $R_1$ | $R_2$ | $R_3$ | $R_4$ | $R_5$ | $R_6$ | $R_7$ | $R_8$ | $R_9$ | $R_{10}$ | $R_{11}$ | $R_{12}$ | $R_{13}$ | $R_{14}$ | $R_{15}$ |
|---|---|---|---|---|---|---|---|---|---|---|---|---|---|---|
| 1.7 | 10 | 10 | 10 | 10 | 10 | 10 | 10 | 12 | 10 | 10 | 10 | 10 | 10 | 3 |

TABLE II

| $R_{16}$ | $R_{17}$ | $R_{18}$ | $R_{19}$ | $R_{20}$ | $R_{21}$ | $R_{22}$ | $R_{23}$ (Rsel) | $R_{24}$ | $C_1$ | $C_2$ | $C_3$ | $C_4$ | $C_5$ | $C_6$ | $C_7$ | $C_8$ |
|---|---|---|---|---|---|---|---|---|---|---|---|---|---|---|---|---|
| 20 | 20 | 20 | 1 | 20 | 20 | 20 | select | 20 | 1 | 1 | 1 | 1 | 16 | .047 | 47 | 1 |

($R_{23}$ is selected to scale $E_O$ (H,T) to read in a desired output unit; e.g. volts, inches, ounces, pints, etc., e.g. −20K for volts.)

Rods 107, 109, 111, 113 and 120 are preferably fabricated from aluminum or stainless steel according to this embodiment of the invention, with a quarter inch in diameter. Rods 107 and 109 and rods 111 and 113 are spaced two inches apart on centers. The voltage applied to input rods 107 and 111 is about 0.08 volts RMS, at an input frequency of 3.00 kHz. The use of an alternating current input signal to the rods helps prevent electrolytic deposition on the rods. Also, in this embodiment, the ratio of current from hot coffee, to current from room-temperature tap water is measured to be 12.26:1.

Theory of Operation

The sensed current $I_M$ in the measurement vessel is converted to voltage $E_M$ at operational amplifier $U_1$, pin 6. The sensed current $I_R$ in the reference vessel is converted to a voltage $E_R$ at operational amplifier $U_6$, pin 6. Voltages $E_M$ and $E_R$ are full wave rectified, and appear at $U_3$, pin 6 and $U_8$, pin 6 respectively.

In each of the vessels, the sensed current is proportional to the height of the liquid:

$$I_R = KH_R \text{ and } I_M = KH_M. \quad (4)$$

The quantity "K" depends upon the conductivity of the liquid. Therefore:

$$\frac{H_R}{H_M} = \frac{I_R}{I_M} \quad (5)$$

According to Ohm's Law, $I_M$ equals $E_M/R_1$, and $I_R$ equals $E_R/R_9$. Therefore, according to equation (4):

$$\frac{E_M H_R}{E_R H_M} = \frac{R_1}{R_9} \quad (6)$$

Therefore, $$H_M = \frac{R_9 E_M}{R_1 E_R} H_R \quad (7)$$

and thus the parameter $$\rho = \frac{R_9 E_M}{R_1 E_R} \quad (8)$$

This provides an equation for $H_M$ when the other quantities in equation (6) are known or measured. From FIG. 2 it can be shown that $$E_O = \frac{10 E_M R_8}{E_R R_7} \quad (9)$$

This output voltage appears at multiplier $U_5$, pin 3 (line 257). This voltage is directly related to $\rho$ by a constant and therefore can be used to calculate $H_M$. Thus, operational amplifier $U_4$ and multiplier $U_5$ perform the function of a divider circuit.

Thus, $$E_o = 10 \frac{R_8 H_M R_1}{R_7 H_R R_9}, \quad (10)$$

and $$H_M = E_o \left[ \frac{H_R R_7 R_9}{10 R_8 R_1} \right]. \quad (11)$$

EXPERIMENTAL RESULTS

Figure 4:
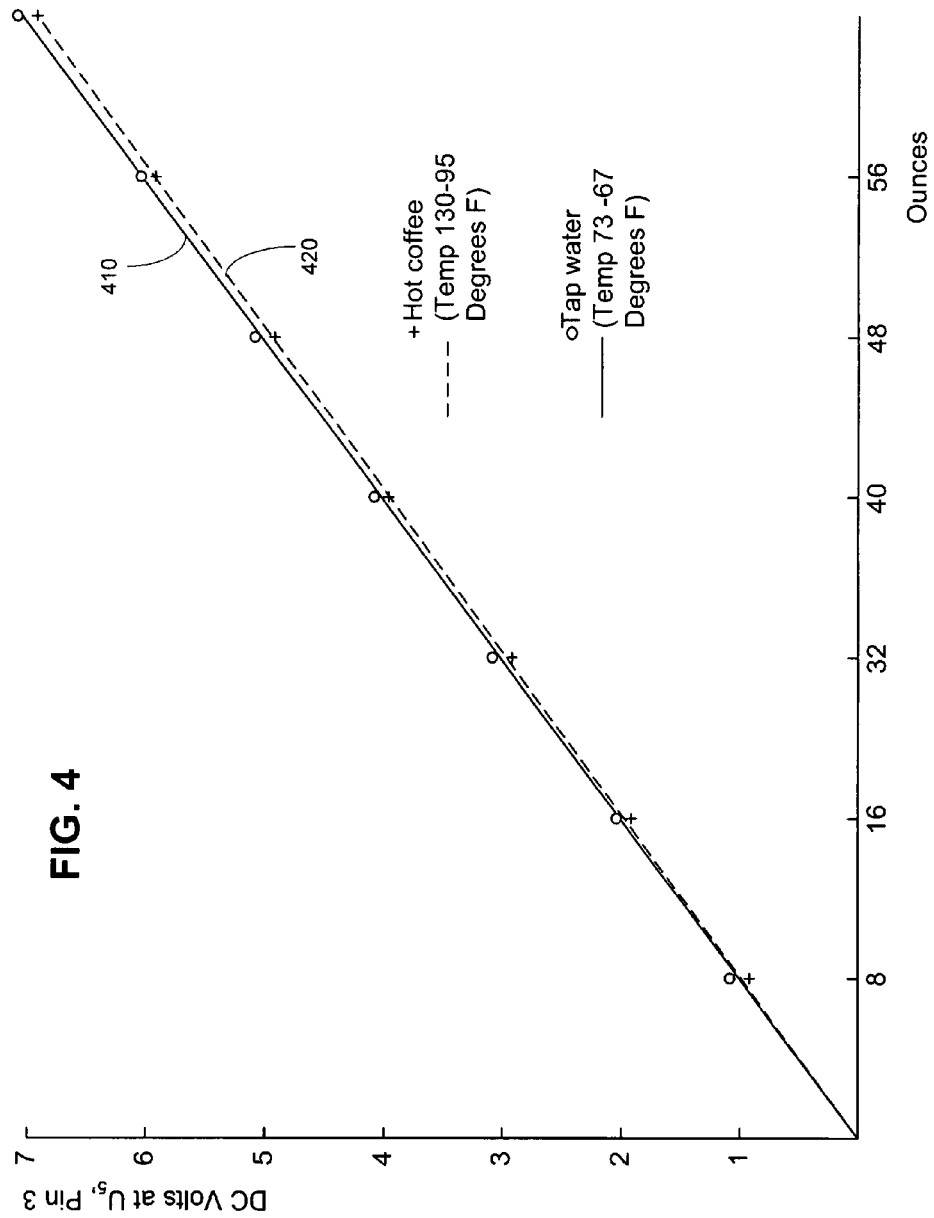
FIG. 4 is a graphical depiction of voltage versus ounces of liquid (ounces related to height), using a measurement device according to an embodiment of the present invention, without thermal compensation.

FIG. 4 is a graphical depiction of experimental results using the measurement device according to the present invention with the measurement circuitry shown in FIG. 2, that is, without temperature compensation. The graph has a horizontal axis with units representing the weight of the liquid in the measurement vessel (in ounces), and a vertical axis representing the DC voltage at U5 pin 3; that is, $E_O$. The horizontal axis is shown in ounces but is directly related to the height of the liquid in the measurement vessel based upon the geometry of the measurement vessel such as shown in FIG. 1A and the specific weight of the liquid (in this case, water and coffee). In this particular example, the specific weights of the two liquids are approximately the same. However, the electrical conductivity of hot coffee is approximately 12.26 times greater than the electrical conductivity of tap water for the example actually tested. The graph shows that output voltage $E_O$ is directly related to height of the liquid and that the measurements for liquids with different electrical conductivities are comparable to each other.

Nevertheless, as clearly seen in FIG. 4 as the output voltage $E_O$ increases, it directly represents an increase in the height of the liquid in the measurement vessel (thus, its weight depending upon the specific weight of the liquid) and, as can be seen, the deviation between line 410 representing tap water and the dashed line 420 representing hot coffee is very little even though the conductivity of the two liquids is greatly different.

It should further be noted that the temperature of the hot coffee in this particular example ranges from 130° F. to 95° F. while the temperature of the tap water ranged from 73° F. to 67° F.

Figure 3:
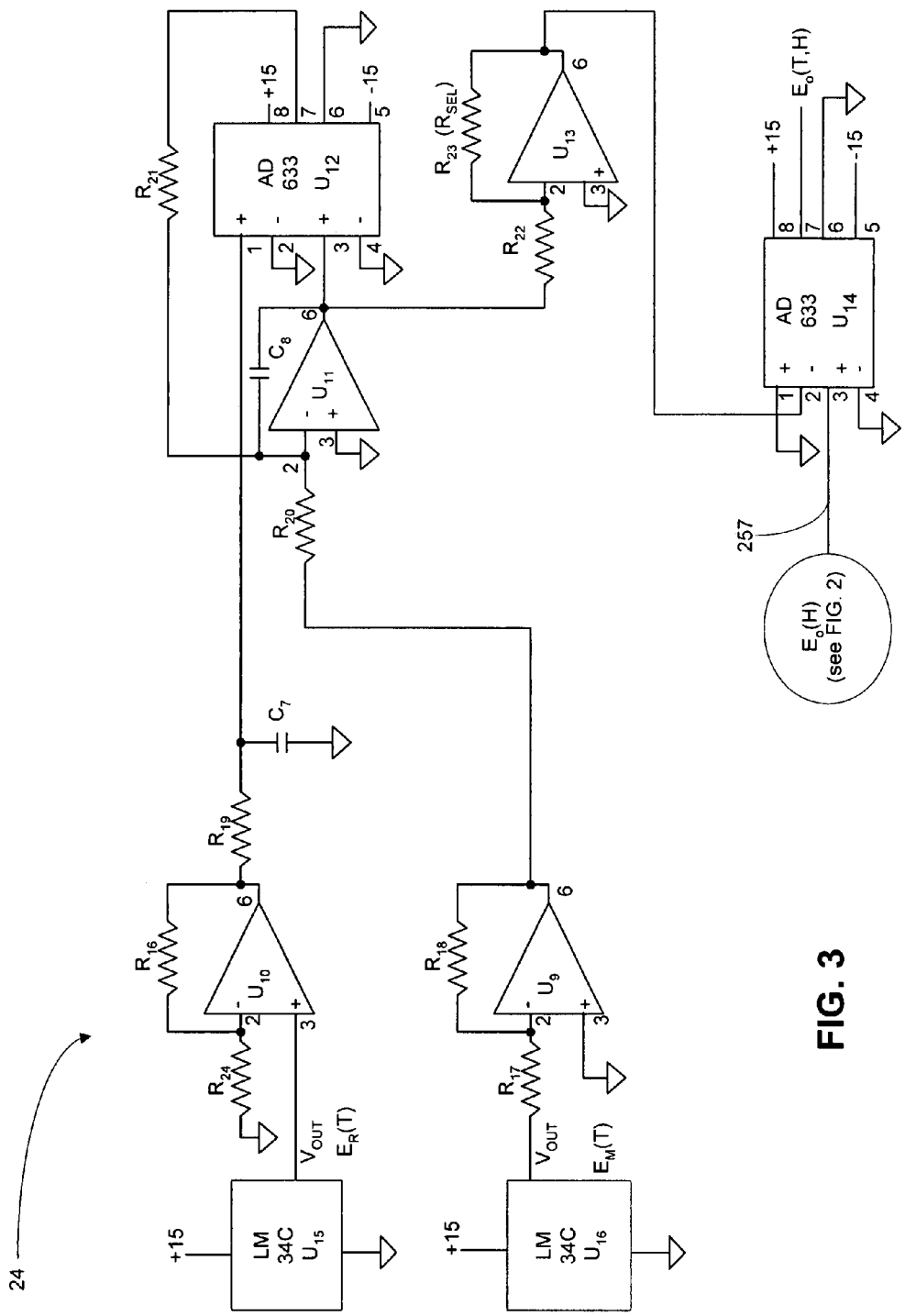
FIG. 3 is a schematic diagram of a thermal compensating circuit that can form part of the measurement circuit.
Figure 5:
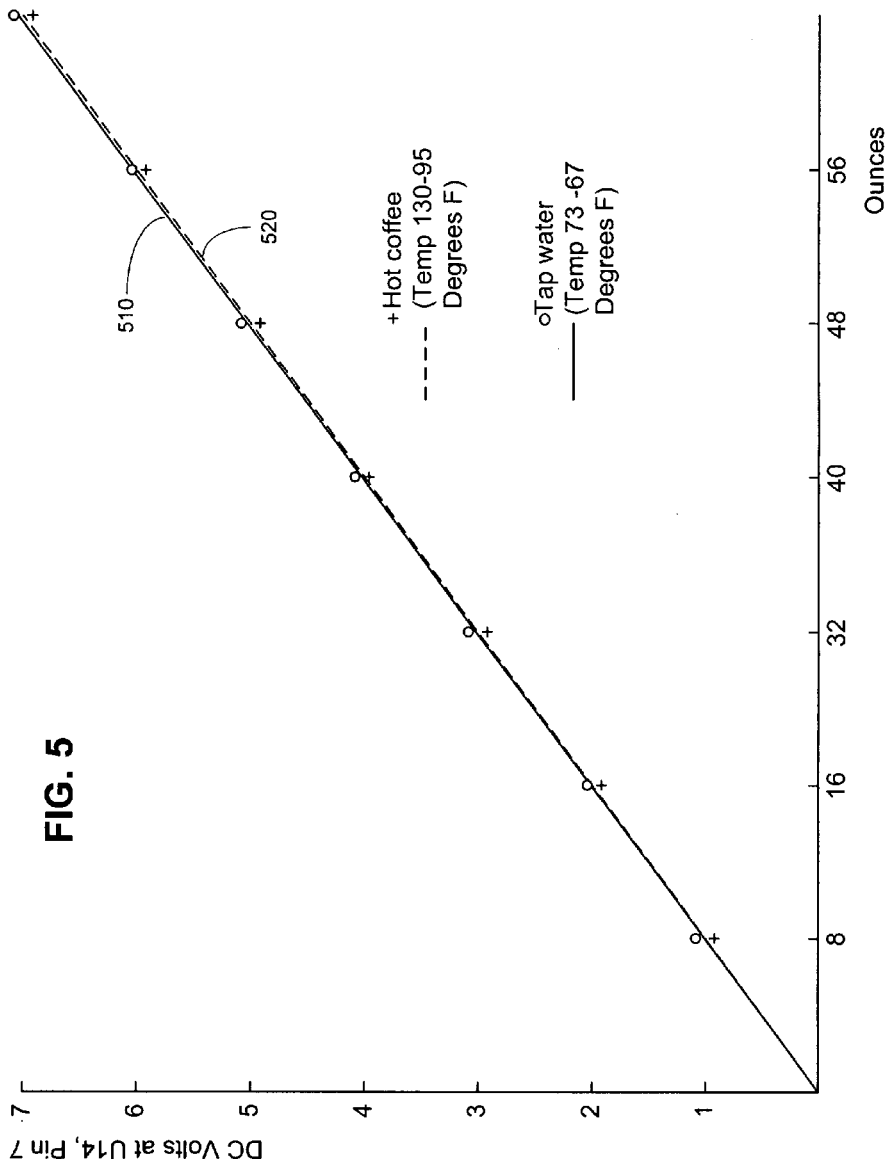
FIG. 5 is a graphical depiction of voltage versus ounces of liquid (ounces related to height), using a measurement device according to an embodiment of the present invention, with thermal compensation.

This exemplary embodiment of the invention also provides a thermal correction circuit 24, as seen in FIG. 3, with capacitances and resistances as shown above in Table I and Table II. Temperature sensors 121 and 123 are located inside quarter-inch-diameter hollow rods 109 and 120 in FIG. 1A. The sensors sense the liquid temperatures in the vessels. Conductivity of the liquid typically increases with temperature, and if temperatures differ between the reference and measurement vessels, then accuracy and repeatability could be somewhat affected as indicated FIG. 4, unless a thermal correction circuit is used to address the temperature affect, as shown by the graph of FIG. 5.

Thus, in some implementations of the present invention, it may be useful to also include a thermal correction circuit 24 as shown in FIG. 3. This will not be needed if the liquid in the reference vessel is not substantially different from the temperature of the liquid in the measurement vessel. Uncorrected thermal data is plotted in FIG. 4, with reference to the output of multiplier $U_5$ pin 3 shown in FIG. 2. Output volts versus ounces are plotted for tap water 410 and also for hot coffee 420, and it can be seen that the lines diverge somewhat at greater voltage. In contrast, corrected thermal data is plotted on FIG. 5, with reference to the output of multiplier $U_{14}$ pin 7, representing output $E_O$ (T,H) in direct current (DC) volts. The lines 510 (tap water) and 520 (hot coffee) in FIG. 5 only slightly diverge at greater voltages, thus demonstrating the accuracy of the thermal compensating circuit shown in FIG. 3.

The temperature sensors 121 and 123 may be Fahrenheit calibrated sensors with a nominal temperature gradient of 10 millivolts per degree Fahrenheit. The reference vessel temperature probe is inserted into collector rod 109 that is also used to sense the electric current in the vessel. A separate probe may be used to sense liquid temperature in the measurement vessel 105. The thermal sensor 123 can alternatively be located in the rods 111 or 113, but it is sometimes easier to locate this sensor separately in order to facilitate assembly and/or disassembly of the apparatus.

In this embodiment of the invention, the thermal probe rods 109 and 120 are filled with thermally conductive epoxy, with a high resistance typically greater than 20 megohms. The divider circuit comprising $U_{11}$ and $U_{12}$ of FIG. 3 has the following output: $10E_R(T)/[2E_M(T)]$ where temperatures are measured in degrees Fahrenheit, where $E_R(T)$ corresponds to the liquid temperature in the reference vessel, and $E_M(T)$ corresponds to the liquid temperature in the measurement vessel. This output is multiplied by the quantity $E_O(H)$ at $U_5$, pin 3 (line 257), which ultimately yields at the output of $U_{14}$, pin 7 the following value:

$$E_O(T,H)=[E_M(H)/E_R(H)][R_8/R_7][10R_{21}/R_{20}][R_{23}/R_{22}] \\ E_R(T)/[2E_M(T)]. \quad (12)$$

Substituting for $E_M(H)/E_R(H)$ yields:

$$E_o = \left[10\frac{R_8}{R_7}\frac{H_M R_1}{R_9}\right]\left[\frac{R_{21}R_{23}}{R_{20}R_{22}}\right]\left[\frac{E_R(T)}{2E_M(T)}\right]. \quad (13)$$

Equation (10) gives the thermal corrected voltage level therefore is directly proportional to the height of the liquid in the measurement vessel. The factor of 10 is a multiplier device constant, due to the analog multiplier AD633 having a scaling factor of 10.

Geometry of the Measurement Vessel

The radius L of the measurement vessel may, for example, increase with height H. This appears to reduce the electronically measured height $H_1$ as compared to the actual height $H_2$. However, $H_2$ can be calculated from $H_1$.

TABLE III

| Ounces of Liquid | Height corrected radius multiplier |
| --- | --- |
| 8.0 | 1.0 |
| 16.0 | 1.00613 |
| 24.0 | 1.01228 |
| 32.0 | 1.0184 |
| 40.0 | 1.0247 |
| 48.0 | 1.0308 |
| 56.0 | 1.03703 |

The volume in the measurement vessel is given by $$\text{volume}=\pi(L_1)^2 H_1=\pi(L_2)^2 H_2$$

as if the vessel were a right circular cylinder. $H_1$ is the electronically measured uncorrected height, and $H_2$ is the actual corrected height. Solving for the corrected height as a function of radius, yields:

$$H_2=(H_1)(L_1)^2/(L_2)^2. \quad (11)$$

The radial quantities L1 and L2 can, for example, be predetermined functions of H1. Table III shows how L1 and L2 are related to each other and to the volume, given one particular shape of the measurement vessel.

The relationship of the voltage at $U_5$, pin 3 (FIG. 2) to the voltage at $U_{14}$, pin 7 is determined by the temperatures of the liquids in the reference and measurement vessels. For example, at 56 ounces conducted in separate tests, tap water gives a value of 3.7851 volts, and hot coffee gives a value of 3.793 volts. The percentage difference between these two values is: 3.793-3.7851/3.793=0.2%.

Flow Chart of a Computer Program Product

Figure 6:
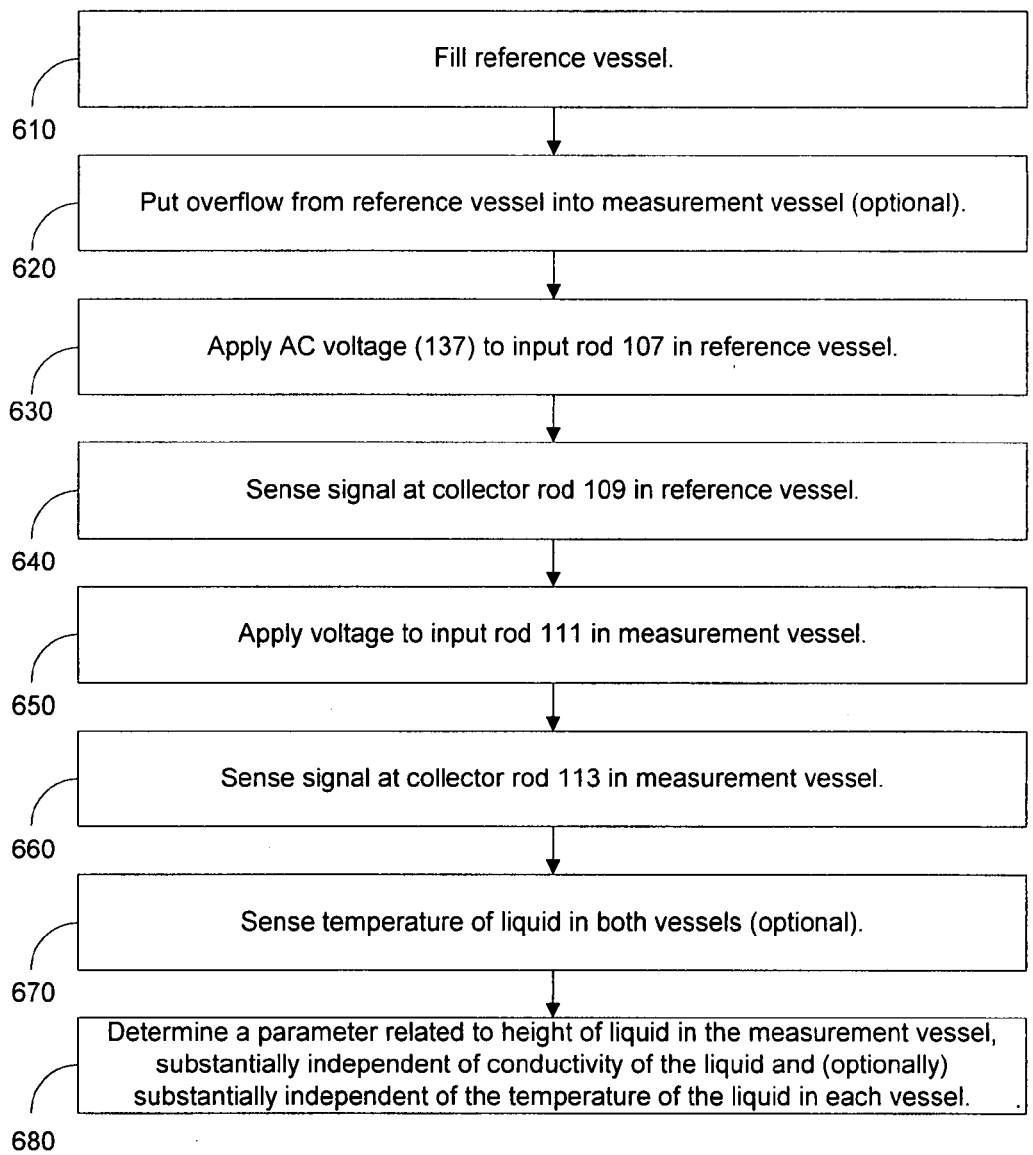
FIG. 6 is a flow chart of a method according to an embodiment of the present invention.

A method 600 according to an exemplary embodiment of the invention is summarized in the flow chart of FIG. 6. The reference vessel is filled 610, and then overflow can optionally be put 620 into a measurement vessel. The voltage is applied 630 to an input rod 107 in the reference vessel, and a collector rod 109 is used 640 to sense that voltage after current has passed through the liquid from the rod 107 to the rod 109. The voltage is also applied 650 to an input rod 111 in the measurement vessel, and collector rod 113 in the measurement vessel is used 660 to sense that voltage. Also, a temperature of the liquid can be optionally sensed 670 in both vessels. Finally, a parameter is determined 680 that is related to height of liquid in the measurement vessel, substantially independent of the conductivity of the liquid and optionally independent of temperature differences between the liquid in the two vessels.

Figure 7:
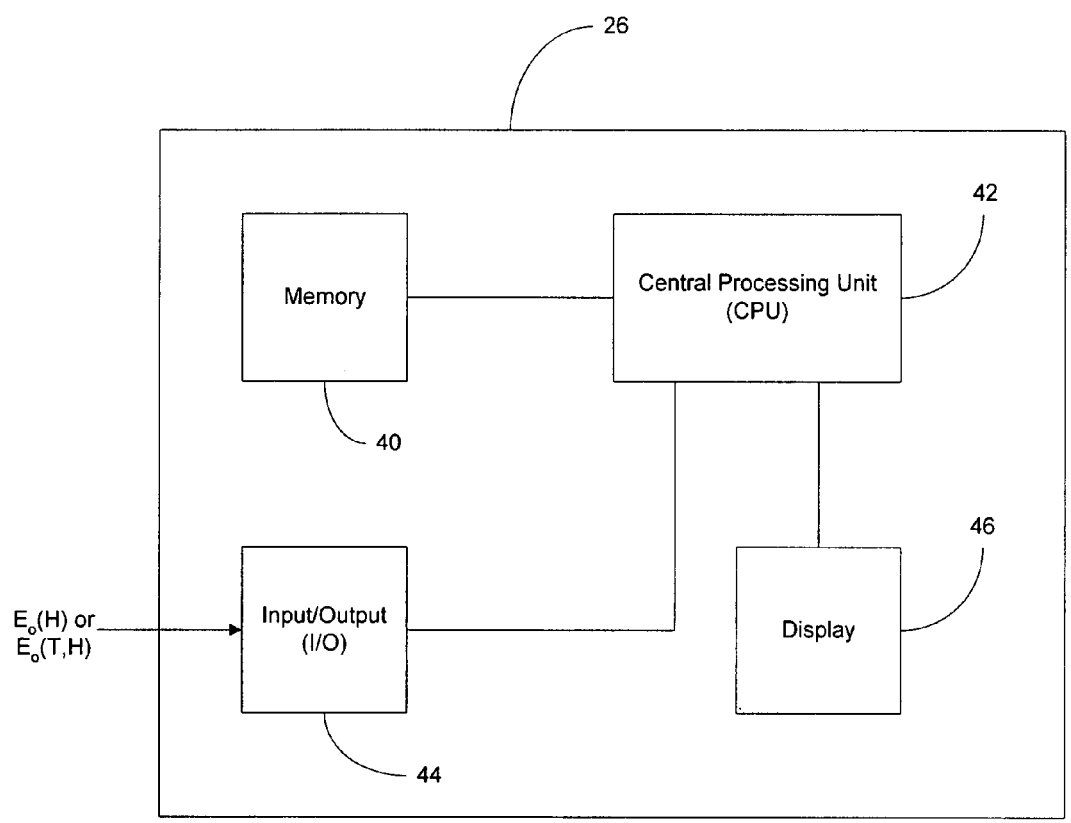
FIG. 7 is a block diagram of a computation and display module that can form part of the measurement device shown in FIG. 1.

In addition to or instead of the circuitry described herein, the present invention can be implemented using a general purpose or specific-use computer system shown in FIG. 7, with program code conforming to the method described herein. The computer system of this embodiment may include a memory 40, a CPU processor 42, input/output (I/O) 44 and a display 46. The CPU may be a single processing unit, or multiple processing units capable of parallel operation, or the processor can be distributed across one or more processing units in one or more locations, e.g., on a client and server. Memory 40 may comprise any known type for data storage, including magnetic media, optical media, random access memory (RAM), read-only memory (ROM), a data cache, a data object, etc. Moreover, the memory may reside at a single physical location, comprising one or more types of data storage, or be distributed across a plurality of physical systems in various forms. Memory 40 may contain not only the program code but also values representing voltage $E_R$ (see FIG. 2) of the liquid in the reference vessel when at a known height $H_R$. Values $E_R$ for different liquids can be stored. Temperature compensating values for liquids at different temperatures in the reference vessel and measurement vessel can also be stored in the memory. By storing such values, the reference vessel need not be present when measurements are made for liquid in the measurement vessel. The display can be any type generally known in the art, and can include a printer or audio annunciating device. Of course, the $E_O$ output can be directly sensed with a voltmeter if so desired.

Applications of the Measurement Device

Potential implementations of the present invention are widespread, and include coffee makers, windshield wiper fluid alerts, measurement of liquids for medical research, dispensing and measuring pharmaceutical liquids, washing machines, sump pump warning levels, upper and lower fluid levels detection, beverage dispensing, and saline solutions. Another potential implementation is detection of liquid moisture in sugar, cereal, and other products.

It is to be understood that the present figures, and the accompanying narrative discussions of best mode embodiments, do not purport to be completely rigorous treatments of the invention under consideration. A person skilled in the art will understand that the structures and methods of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method of determining a parameter related to the height of a liquid in a measurement vessel, comprising:
    applying an alternating voltage to a first conducting rod positioned in a reference vessel containing said liquid at a known height,
    obtaining a reference signal from a second conducting rod positioned in said reference vessel,
    applying said alternating voltage to a third conducting rod positioned in said measurement vessel containing said liquid,
    obtaining a measurement signal from a fourth conducting rod positioned in said measurement vessel; and
    determining said parameter based upon a relationship between said reference signal and said measurement signal,
    wherein the determining of said parameter is substantially independent of electrical conductivity of the liquid in said vessels.

2. The method of claim 1, further comprising sensing a temperature of the liquid in said reference vessel and said measurement vessel, and using the temperature in the determining of said parameter.

3. The method of claim 1, further comprising determining the height of the liquid in the measurement vessel based on said parameter and said known height of the liquid in the reference vessel.

4. The method of claim 1, also comprising filling the reference vessel, and then pouring the liquid into the measurement vessel as overflow from the reference vessel.

5. The method of claim 1, wherein the reference signal obtained is stored in a memory so that the remaining actions can be performed without the reference vessel.

6. An apparatus for determining a parameter related to the height of a liquid in a measurement vessel, comprising:
    a reference vessel;
    a measurement vessel;
    an input rod positioned in the reference vessel and configured to accept an alternating voltage,
    a collector rod positioned in said reference vessel and configured to provide a reference voltage in response to the alternating voltage applied to the input rod when said liquid is in said reference vessel at a known height;
    a second input rod positioned in said measurement vessel and configured to accept said alternating voltage,
    a second collector rod positioned in said measurement vessel and configured to provide a measurement voltage in response to the alternating voltage applied to the second input rod when said liquid is in said measurement vessel; and
    circuitry configured to determine said parameter based at least upon a relationship between said reference voltage and said measurement voltage,
    wherein said circuitry is configured to at least facilitate determination of said parameter substantially independently of electrical conductivity of the liquid in said vessels.

7. The apparatus of claim 6, also comprising temperature sensors configured to sense a temperature of the liquid in the reference vessel and of the liquid in the measurement vessel, and wherein said circuitry is further configured to use said sensed temperatures to facilitate determination of said parameter.

8. The apparatus of claim 7, further comprising means for determining the height of the liquid in the measurement vessel based on said parameter and said known height of the liquid in the reference vessel.

9. The apparatus of claim 7, further comprising a computation and display module for annunciating a physical characteristic of the liquid in the measurement vessel based on said parameter and known height of the liquid in the reference vessel.

10. The apparatus of claim 9, wherein said physical characteristic is from the group consisting of height, volume and weight.

11. The apparatus of claim 6, further comprising means for determining the height of the liquid in the measurement vessel based on said parameter and said known height of the liquid in the reference vessel.

12. The apparatus of claim 6, also comprising an overflow device configured to fill the reference vessel to a known height and to allow excess fluid in the reference vessel to flow into the measurement vessel.

13. The apparatus of claim 6, further comprising a computation and display module for annunciating a physical quality of the liquid in the measurement vessel based on said parameter and said known height of the liquid in the reference vessel.

14. Hardware for determining a parameter related to the height of a liquid in a measurement vessel, comprising:
    circuitry configured to apply an alternating voltage to an input rod positioned in a reference vessel, when said liquid is in said reference vessel at a known height,
    circuitry configured to obtain a reference sense voltage from a collector rod positioned in said reference vessel,
    circuitry configured to apply said alternating voltage to a second input rod positioned in said measurement vessel,
    circuitry configured to obtain a measurement sense voltage from a second collector rod positioned in said measurement vessel when said liquid is in said measurement vessel; and
    circuitry configured to determine said parameter based upon a relationship between said reference voltage and said measurement voltage.

15. The hardware of claim 14, also comprising a thermal compensating circuit configured to use a sensed temperature of the liquid in the measurement vessel and a sensed temperature of the liquid in the reference vessel in the determining of said parameter.

16. The hardware of claim 14, further comprising a computation and display module for annunciating a physical quality of the liquid in the measurement vessel based on said parameter and known height of the liquid in the reference vessel.

17. A computer program product for determining a parameter related to the height of a liquid in a measurement vessel, comprising a computer readable medium having executable code stored therein; the code, when executed by a processor, adapted to facilitate the functions of:

applying an alternating voltage to a first conducting rod positioned in a reference vessel containing said liquid at a known height, obtaining a reference signal from a second conducting rod positioned in said reference vessel, applying said alternating voltage to a third conducting rod positioned in said measurement vessel containing said liquid, obtaining a measurement signal from a fourth conducting rod positioned in said measurement vessel; and determining said parameter based upon a relationship between said reference signal and said measurement signal, wherein the determining of said parameter is substantially independent of electrical conductivity of the liquid in said vessels.

18. The computer program product of claim 17, wherein the code is also adapted to use a sensed temperature of the liquid in the reference vessel and a sensed temperature of the liquid in the measurement vessel in the determining of said parameter.

19. The computer program product of claim 17, wherein the value of the reference voltage is stored in said readable medium so as to obtain said measurement voltage without the reference vessel.

* * * * *